US010160146B2

(12) United States Patent
Fortunato et al.

(10) Patent No.: US 10,160,146 B2
(45) Date of Patent: Dec. 25, 2018

(54) THERMOPLASTIC FIBER COMPOSITES HAVING HIGH VOLUME FIBER LOADING AND METHODS AND APPARATUS FOR MAKING SAME

(75) Inventors: Kevin Fortunato, Ambler, PA (US); Steven Spadaccino, Levittown, PA (US)

(73) Assignee: Greene, Tweed Technologies, Inc., Wilmington, DE (US)

(*) Notice: Subject to any disclaimer, the term of this patent is extended or adjusted under 35 U.S.C. 154(b) by 516 days.

(21) Appl. No.: 13/208,780

(22) Filed: Aug. 12, 2011

(65) Prior Publication Data

US 2012/0040170 A1 Feb. 16, 2012

Related U.S. Application Data

(60) Provisional application No. 61/373,450, filed on Aug. 13, 2010.

(51) Int. Cl.
*B29C 45/02* (2006.01)
*B29C 43/02* (2006.01)
(Continued)

(52) U.S. Cl.
CPC ............ *B29C 45/02* (2013.01); *B29C 43/021* (2013.01); *B29C 43/36* (2013.01); *C08J 5/04* (2013.01);
(Continued)

(58) Field of Classification Search
CPC ........ B29C 43/021; B29C 43/36; B29C 45/02
(Continued)

(56) References Cited

U.S. PATENT DOCUMENTS 669,632 A 5/1902 Richards
2,654,949 A * 10/1953 Whiteley, Jr. et al. ....... 433/213
(Continued)

FOREIGN PATENT DOCUMENTS

DE 4 445 307 C1 9/1996
EP 0 376 472 A2 7/1990
(Continued)

OTHER PUBLICATIONS

PCT International Search Report, International Application No. PCT/US2011/047558, dated Dec. 21, 2011, 9 pages.
(Continued)

*Primary Examiner* — Matthew J Daniels
(74) *Attorney, Agent, or Firm* — Flaster/Greenberg P.C.

(57) ABSTRACT

A method and apparatus are provided which enable formation of a thermoplastic article having a high volume loading of a long fiber reinforcement. The method includes providing a first thermoplastic composite material having at least about 40 volume percent of at least one reinforcing fiber; providing at least one mold, the mold(s) each comprising at least one first mold section having an inlet and an outlet and defining a first mold cavity and at least one second mold section having an inlet and an outlet and defining a second mold cavity, wherein the outlet of the first mold section is in communication with the inlet of the second mold section; introducing the first thermoplastic composite material into the first mold cavity; applying heat and pressure to the first thermoplastic composite material in the first mold cavity until the first mold section reaches at least a first process temperature; releasing the pressure on the mold; and reapplying pressure to the mold while cooling, wherein at least a portion of the first thermoplastic composite material flows out of the least one outlet of the first mold section and into the second mold cavity, wherein said cooling solidifies the
(Continued)

first thermoplastic composite to form a molded article having the shape of the second mold cavity. Articles formed from such methods and apparatus are also disclosed.

34 Claims, 7 Drawing Sheets

(51) Int. Cl.
  *B29C 43/36* (2006.01)
  *C08J 5/04* (2006.01)
  *B29K 101/12* (2006.01)
  *B29K 105/08* (2006.01)

(52) U.S. Cl.
  CPC .. *B29C 2043/3615* (2013.01); *B29K 2101/12* (2013.01); *B29K 2105/08* (2013.01); *C08J 2300/22* (2013.01); *Y10T 428/24994* (2015.04); *Y10T 428/31504* (2015.04)

(58) Field of Classification Search
  USPC .......................... 264/328.17, 328.18, 328.19
  See application file for complete search history.

(56) References Cited

U.S. PATENT DOCUMENTS

| | | | |
|---|---|---|---|
| 3,859,409 A * | 1/1975 | Coonrod | 264/295 |
| 3,986,804 A | 10/1976 | Albright | |
| 4,044,188 A | 8/1977 | Segal | |
| 4,255,367 A | 3/1981 | Wallace et al. | |
| 4,318,686 A | 3/1982 | Morgan | |
| 4,479,998 A | 10/1984 | Belbin et al. | |
| 4,526,195 A | 7/1985 | Humphrey et al. | |
| 4,532,169 A | 7/1985 | Carley | |
| 4,592,720 A | 6/1986 | Dugan et al. | |
| 4,611,983 A | 9/1986 | Bielfeldt | |
| 4,695,602 A * | 9/1987 | Crosby et al. | 524/439 |
| 4,779,835 A | 10/1988 | Fukushima et al. | |
| 5,019,450 A | 5/1991 | Cogswell et al. | |
| 5,049,055 A | 9/1991 | Yokoyama | |
| 5,057,257 A * | 10/1991 | Neitzke | 264/138 |
| 5,069,840 A | 12/1991 | Arnott | |
| 5,139,405 A | 8/1992 | Krone et al. | |
| 5,260,012 A | 11/1993 | Arnott | |
| 5,395,226 A | 3/1995 | Sakai et al. | |
| 5,433,419 A | 7/1995 | Murakami | |
| 5,447,793 A | 9/1995 | Montsinger | |
| 5,482,667 A | 1/1996 | Dunton et al. | |
| 5,725,954 A | 3/1998 | Montsinger | |
| 5,770,128 A | 6/1998 | Kobayashi et al. | |
| 5,824,237 A | 10/1998 | Stumpf et al. | |
| 5,851,559 A | 12/1998 | Scribner et al. | |
| 6,103,348 A | 8/2000 | Scharrenberg et al. | |
| 6,106,259 A | 8/2000 | Lee et al. | |
| 6,399,524 B1 | 6/2002 | Creasy | |
| 6,491,509 B1 | 12/2002 | Schad et al. | |
| 6,558,603 B2 | 5/2003 | Klotz et al. | |
| 6,719,551 B2 | 4/2004 | Polk, Jr. | |
| 6,746,225 B1 | 6/2004 | McHugh | |
| 6,846,857 B1 | 1/2005 | Lindner | |
| 6,869,558 B2 | 3/2005 | Polk, Jr. et al. | |
| 6,900,547 B2 | 5/2005 | Polk, Jr. et al. | |
| 6,918,985 B2 | 7/2005 | Geyer | |
| 7,081,219 B2 | 7/2006 | Stewart | |
| 7,114,939 B2 | 10/2006 | Tan et al. | |
| 7,153,116 B2 | 12/2006 | Tofukuji et al. | |
| 7,208,219 B2 | 4/2007 | Polk, Jr. et al. | |
| 7,291,304 B2 | 11/2007 | Bouti | |
| 7,470,388 B2 | 12/2008 | Husler et al. | |
| 7,754,323 B2 | 7/2010 | Murai et al. | |
| 8,066,927 B2 | 11/2011 | Duqueine et al. | |
| 8,758,874 B2 | 6/2014 | Taketa et al. | |
| 2003/0057590 A1 | 3/2003 | Loher et al. | |
| 2004/0224590 A1 | 11/2004 | Rawa et al. | |
| 2006/0125148 A1 | 6/2006 | Keir et al. | |
| 2006/0125156 A1 * | 6/2006 | Woolhouse | 264/571 |
| 2006/0233904 A1 | 10/2006 | Mattice et al. | |
| 2007/0007685 A1 | 1/2007 | Gleich et al. | |
| 2008/0029929 A1 | 2/2008 | Hutchinson et al. | |
| 2009/0166920 A1 | 7/2009 | Tokunou et al. | |
| 2010/0004374 A1 * | 1/2010 | Lahijani | 524/496 |
| 2011/0111172 A1 | 5/2011 | Gideon et al. | |
| 2013/0047403 A1 | 2/2013 | Gideon et al. | |

FOREIGN PATENT DOCUMENTS

| | | |
|---|---|---|
| JP | 3-182315 A | 8/1991 |
| JP | 4-84309 A | 3/1992 |
| JP | 2006-103099 A | 4/2006 |
| JP | 2007-015382 A | 1/2007 |
| JP | 2008-207545 A | 9/2008 |
| JP | 2008-254437 A | 10/2008 |
| WO | WO 2007/097436 A1 | 9/2007 |
| WO | WO 2008/139077 A2 | 11/2008 |

OTHER PUBLICATIONS

PCT International Preliminary Report on Patentability, International Application No. PCT/US2011/047558, dated Feb. 19, 2013, 7 pages.
Japanese Official Action, Japanese Patent Application No. 2013-524244, dated Nov. 27, 2014, 4 pages.
Mathur, Raj N., Design Considerations for successfully using long fiber thermoplastic composites as substitutes for metal, PlastiComp, Inc. (2015).
Malnati, Peggy, Reinforced Thermoplastic: LFRT vs. GMT, *Composites Technology*, (2007).
Mason, Karen, Compression molding press technology adapts to meet new composite material processing requirements, *Composites Technology*, (2015).
U.S. Congress, Office of Technology Assessment, Chapter 7 Case Study: Polymer Matrix Composites in Authomobiles, *Advanced Materials by Design*, OTAE-351, Washington, DC: U.S. Government Printing Office (Jun. 1988).
Canadian Office Action dated Oct. 28, 2015 in Application No. 2,808,311 (counterpart of U.S. Appl. No. 13/208,780) (4 pages).
European Search Report dated Oct. 20, 2017 in counterpart European application No. 11817093.5 (9 pages).

* cited by examiner

THERMOPLASTIC FIBER COMPOSITES HAVING HIGH VOLUME FIBER LOADING AND METHODS AND APPARATUS FOR MAKING SAME

CROSS REFERENCE TO RELATED APPLICATION

This application claims the benefit under 35 U.S.C. § 119(e) of U.S. Provisional Patent Application No. 61/343,450, filed Aug. 13, 2010, entitled "Thermoplastic Fiber Composites Having High Volume Fiber Loading and Methods and Apparatus for Making Same," the entire disclosure of which is incorporated herein by reference.

BACKGROUND OF THE INVENTION

Field of the Invention

The invention is related to the field of forming thermoplastic/fiber composite materials, specifically to forming such composites using long fiber in high volume fiber loading.

Description of Related Art

In forming articles from thermoplastic composites, typically, a preliminary structure such as a pellet, pre-preg (sheets, films, ribbons), rod stock or other fiber-loaded structure is formed, and then that preliminary structure undergoes a further forming process such as injection molding, compression molding, stamping, laminating and the like to form a thermoplastic composite structure.

Examples of existing technology for forming thermoplastic composite articles may be found in U.S. Pat. No. 5,139,405, which teaches a stamping process using stacked pre-preg laminated structures. U.S. Pat. No. 7,081,219 describes various molding techniques for molding of composites, including various compression molding techniques, and teaches a zone-molding apparatus with a vacuum assist in which various pressure actuators distribute pressure load across an upper mold section on the part to be molded. The process claims to allow resin to flow over the surface of a part, with or without use of a pre-preg, then forces resin through the part in the thickness direction to allow for high volume fiber loading (about 60%).

In most cases in the prior art, difficulties are encountered when trying to highly load a molded article (whether directly or from a pre-preg) through injection and compression molding using engineering thermoplastics. Injection molding processes generally do not accommodate high volume of fiber loading to form uniform composite parts. Difficulties can also arise in flowing the material in the presence of a high volume fiber loading.

While attempts have been made to coat or force resin through pre-pregs that have high fiber volume loading, such attempts can result in air pockets or voids, difficulty in flowing resin through the highly loaded pre-preg for adequate wetting, and problems in achieving a method that efficiently and uniformly makes strong parts with a high fiber loading.

Accordingly, there is a need in the art for a method to form articles from thermoplastic composite material having long fiber reinforcement, for example, thermoplastic composite parts, wherein the articles have high volume fiber loading in a thermoplastic resin matrix, in a manner that provides strong and uniform composite articles formed of such resins and having randomly dispersed long fiber reinforcement in the articles after the molding process. There is also a need for such a method, wherein the method is efficient and easy to implement in manufacture, particularly in making parts having configurations with detailed features.

BRIEF SUMMARY OF THE INVENTION

The invention includes a method of forming a thermoplastic article having a long fiber reinforcement, comprising (a) providing a first thermoplastic composite material having at least about 40 volume percent of at least one reinforcing fiber; (b) providing at least one mold, the mold comprising at least one first mold section having an inlet and an outlet and defining a first mold cavity and at least one second mold section having an inlet and an outlet and defining a second mold cavity, wherein the outlet of the first mold section is in communication with the inlet of the second mold section; (c) introducing the first thermoplastic composite material into the first mold cavity; (d) applying heat and pressure to the first thermoplastic composite material in the first mold cavity until the first mold section reaches at least a first process temperature; (e) releasing the pressure on the mold; and (f) reapplying pressure to the mold while cooling, wherein at least a portion of the first thermoplastic composite material flows out of the least one outlet of the first mold section and into the second mold cavity, wherein said cooling solidifies the first thermoplastic composite to form a molded article having the shape of the second mold cavity.

In one embodiment, the first thermoplastic composite material comprises a thermoplastic which is a polysulfone, a polyimide, a polyamideimide, a polyamide, or a polyarylene ether selected from the group consisting of polyether ketones, polyetherether ketones, polyetherketone ketones. The thermoplastic can also preferably comprise a fluoropolymer selected from the group consisting of copolymers of tetrafluoroethylene and at least one perfluoroalkylvinyl ether; copolymers of tetrafluoroethylene and at least one other perfluorinated alkylene, polychlorotrifluoroethylene, ethyl chlorotrifluoroethylene, ethyltrifluoroethylene, polyvinylidene fluoride, and polyvinyl fluoride.

In yet a further preferred embodiment, the thermoplastic composite material comprises a thermoplastic is selected from polyetherether ketone, polyether ketone, polyether ketone ketone, copolymers of tetrafluoroethylene and at least one perfluoroalkylvinyl ether, and copolymers of tetrafluoroethylene and hexafluoropropylene.

It is preferred that the at least one reinforcing fiber is discontinuous long fiber. The at least one reinforcing fiber may comprise a fiber selected from the group consisting of inorganic fibers, ceramic fibers, glass fibers, graphite fibers, carbon fibers, thermoplastic fibers and/or thermosetting fibers.

In one embodiment, step (a) of the method may further comprise preparing the first thermoplastic composite material by chopping or cutting a continuous long fiber-reinforced composite into a plurality of sections having discontinuous long fiber. The continuous long fiber-reinforced composite may be provided as a continuous long fiber-reinforced tape, and the plurality of sections having discontinuous long fiber may have at least two different lengths measured in the longitudinal dimension of the section, and perhaps a variety of lengths.

The first thermoplastic composite preferably has at least about 50 volume percent of the at least one reinforcing fiber, and more preferably at least about 60 volume percent.

The method may also further comprise placing the mold into a heated press, and pressing downward upon the first thermoplastic composite material when it is in the first mold cavity using a ram or piston inserted into the inlet of the first mold section, wherein the heated press drives the ram or piston into the first mold cavity.

The first thermoplastic composite material is preferably heated in the method by heating the mold under pressure in step (d) to about 200° F. to about 900° F., more preferably about 400° F. to about 900° F., even more preferably about 750° F. to about 900° F., and more preferably to about 825° F. to about 875° F., until the first process temperature is achieved. The first process temperature is about 175° F. to about 800° F., preferably about 175° F. to about 780° F., more preferably about 250° F. to about 780° F., and most preferably about 750° F. to about 780° F.

The method may also further include applying pressure to the first thermoplastic composite material in step (d) by placing the mold in a heated press at a preferred pressure of about 1,000 psi to about 10,000 psi. The pressure is more preferably about 2,000 psi to about 5,000 psi. After releasing the pressure on the mold in step (e), the method may further comprise placing the mold in a cooling press, and the cooling press applies pressure to the mold while cooling in step (f), at a pressure of about 1,000 psi to about 10,000 psi, and more preferably of about 2,000 psi to about 5,000 psi.

The outlet of the first mold section is preferably connected to the inlet of the second mold section by at least one flow port, and preferably the mold has a plurality of flow ports.

In step (f) in one embodiment, the method comprises cooling the first thermoplastic material in the second mold cavity to a handling temperature, and further removing the molded article from the second mold cavity.

The invention also includes molded articles formed by the process described herein. Such articles preferably comprise a polyarylene ether thermoplastic and long discontinuous carbon fiber.

The invention also includes an apparatus for forming a thermoplastic article having long fiber reinforcement, comprising (a) at least one mold body having at least one first mold section having an inlet and an outlet and defining a first mold cavity and at least one second mold section having an inlet and an outlet and defining a second mold cavity, wherein the outlet of the first mold section is in communication with the inlet of the second mold section, wherein the second mold cavity has a configuration for forming the article; (b) a piston configured so as to be able to enter the first mold cavity; and (c) at least one press capable of heating and cooling the mold body.

The heated press upon opening is preferably able to receive the mold so that the press can apply heat and pressure to a first thermoplastic composite material in the first mold cavity by pressing on the piston when the piston is inserted into the first mold cavity. The outlet of the first mold section is preferably connected to the inlet of the second mold section by at least one flow port, and preferably a plurality of flow ports.

BRIEF DESCRIPTION OF THE SEVERAL VIEWS OF THE DRAWING(S)

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
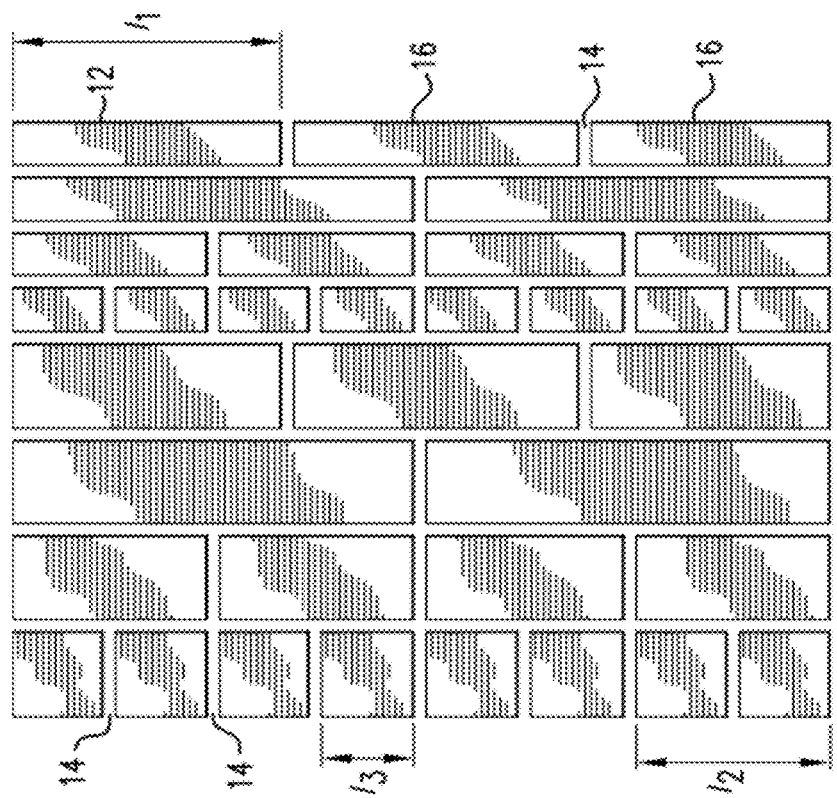
FIGS. 1 and 1a are schematic representations of a continuous long fiber reinforced thermoplastic material and a discontinous long fiber reinforced thermoplastic material made therefrom, respectively, for use in a preferred embodiment of the method described herein.

The invention herein provides a method and apparatus to provide articles formed that are highly filled thermoplastic composites, wherein the composite is filled with at least a long fiber reinforcement. High volume fiber loading is possible, while using a simple molding process to produce strong composite parts having simple or detailed configurations. While traditional injection molding of long fiber reinforced composites is typically limited to volume loading of about 30% to 40% by volume due to flowability issues, the present invention can provide this volume and higher, including up to about 50%, 60% or more.

Traditional injection molding involves heating the reinforced pre-preg or other long fiber composite material used to form a molded article to a processing temperature (e.g., about 760° F.) for flowability, and then the heated material is forced into a heated forming mold. The mold is heated at a much lower temperature than the flowable temperature of the heated composite, for example, in traditional molding of polyetherether ketone (PEEK) composite an injection mold may be heated to about 300° F. to about 400° F. Flowability and filling of the mold as fiber volume gets too high becomes difficult limiting the amount of long fiber reinforcement to be used.

The present invention includes a method and an apparatus having a mold(s) using a unique co-nested cavity mold design, wherein the mold sections and respective mold cavities are co-nested within the same mold so that the composite material having long fiber can continue to flow at its optimum processing temperature as the molding cavity is molded and throughout the cooling portion cycle. This provides for a well-formed article, resulting from easy processing of long fiber reinforced composite materials. The apparatus herein may also be used to process other molding materials and composites, but is particularly beneficial if employed for allowing for the processing of long fiber reinforced thermoplastic composite materials.

In the method herein, starting materials are preferably at least one first thermoplastic composite material, having at least about forty volume percent of at least one reinforcing fiber. Various types of composites may be used, and it is contemplated within the scope of the invention that more than one composite may be introduced into the mold described herein and in the method of the invention simultaneously.

Preferred thermoplastics for use in the composites herein are preferably polymeric plastics and resins that can be loaded or filled with reinforcement, and that can flow under application of heat. Exemplary thermoplastics include polyolefins (such as polyethylene, polybutylene, polypropylene), poly(acrylonitrile-butadiene-styrene) (ABS), polystyrenes, polybutadiene, polyacrylonitrile (PAN), poly(butadiene-styrene) (PBS), poly(styrene-acrylonitrile) (SAN), polybutylenes, cellulosic resins (such as ethylcellulose, cellulose acetate, cellulose acetate butyrate, cellulose acetate propionate, and cellulose nitrate), polyethylene vinyl alcohols (EVA), polyethylene vinyl acetates, fluoropolymers (such as melt-processible fluoroplastics (such as copolymers of tetrafluoroethylene (TFE) and at least one perfluoroalkylvinyl ether (PAVE) (PFA), copolymers of TFE and at least one other perfluorinated alkylene (such as hexafluoropropylene) (FEP)), poly(chlorotrifluoroethylene), polyethyl chlorotrifluoroethylene (ECTFE), polyethyltrifluoroethylene (ETFE), polyvinyl fluoride (PVF) and polyvinylidene fluoride (PVDF)), ionomers, liquid crystalline polymer (LCP), polyacetals, polyacrylates, polyamides (such as NYLON 12, NYLON 6), polyphthalimides, polyimides, polyetheramides, polyamideimides, polyphenols, polycarbonates, polyesters, polyurethanes, polyvinylchlorides (PVC), polyvinylidene chlorides, polyvinyls, polyphenylene oxides (PPO), polyphenylene ethers, polyphenylene esters, polyphenylene ether esters, polyphenylene sulfides, polysulfones, polymethylpentenes, polyketones, polyarylene ether ketones and polyaryl ether ketones (such as polyetherketone (PEK), polyetherketoneketone (PEKK) and polyetheretherketone (PEEK), thermoplastic elastomers (such as ethylene propylene diene monomers (EPDM), ethylenepropylene rubber (EPR) and polyurethane elastomers), epoxy resins, polyethylene chlorinates, biscitraconicimides (BCI), bismaleimides (BMI), bismaleimide/triazine/epoxy resins, cyanate esters, cyanate resins, furanic resins, phenolic resins, urea-formaldehyde resins, melamine-formaldehyde resins, phthalocyanine resins, polybenzoxazole resins, acetylene-terminated polyimide resins, silicones, polytriazines, polyalkyds, and xylene resins.

Co-polymers (polymers formed of two or more monomeric species in random or block form, or graft copolymers, any of which may have multiple monomeric components or reactants) of each or any of these thermoplastics may also be used, whether known or to be developed. In addition, such thermoplastics, provided they are still useful for forming an article from a composite thereof, may be derivatized and/or include functional groups (whether terminal and/or on the chain), branched and/or straight chain backbone structures, additional locations of unsaturation along the chain or side groups, and the like. Functional groups which may be provided include aryls, ketones, acetylenes, acid groups, hydroxyl, sulfur-containing groups, sulfates, sulfites, mercapto, phosphato, carboxyl, cyano, phosphite, oxygen/ether or esters (also can be incorporated within the chains or side chains), carboxylic acid, nitric, ammonium, amide, amidine, benzamidine, imidizole, and the like. Also salts of these polymers, such as potassium or sodium salts may be used. The selected polymer(s) may also be used in mixtures, blends, alloys or copolymerized with each other or other monomers to form new random, block or graft copolymers. Also possible for use within the invention are low moisture thermosetting materials such as certain epoxies and thermosetting materials having similar hygroscopic properties which are similar to thermoplastic properties. For the purpose of convenience and simplification herein, such materials will be included within broad reference to thermoplastics, since they may be substituted in the present invention in place of the thermoplastic material. While these thermoplastics are preferred, the list should not be considered to be exhausted, and one skilled in the art would understand based on this disclosure that other thermoplastics could be used in the invention without departing from the scope thereof.

Preferred materials from those noted above include engineering plastics such as polysulfones, polyimides, polyamideimides, polyamides, polyphenylene oxides and sulfides, and the polyarylene materials, such as PEEK, PEK and PEKK. Fluoropolymers may also be used as preferred materials, provided they are flowable at a processing temperature.

While it is preferred that at least one first thermoplastic composite material be provided herein that has long fiber reinforcement, other thermoplastics and/or thermoplastic composites (having the same or different forms of reinforcement or filler) may be used in addition to the preferred first thermoplastic composite material. Such additives may be provided to the thermoplastic composite preferably by blending with the thermoplastic matrix material. All of the above materials may include, beyond the preferred material noted herein, various other fillers and/or reinforcing agents. Various additives used as reinforcement include, pigments, dyes, glass, ceramic, mesh, honeycomb, mica, clay, organic colorants, plasticizers, thixotropic agents, flame retardants, UV absorbers, extenders, stabilizers, silicon dioxide, silica, alumina, talc, glass fibers, barium sulfate, glass spheres, PTFE short fibers, TFE copolymer short fibers, other reinforcing fibers of varying length, ribbons or platelets, wollastonite, titanate whiskers, compatibilizers, rheological or thixotropic agents, antistatic agents (which may also be incorporated through use of functional groups and/or graft copolymers provided to the thermoplastic matrix), chopped carbon fibers, and other similar fillers, tribological additives and reinforcing agents. It is preferred that such additives (over and above the presence of the first thermoplastic composite material) be present in an amount no greater than about 10% of the composite based on the total weight of the composite, however, more ore less may be used.

In addition, it is within the scope of the invention that the fiber material may be a blended material, i.e., that more than one fiber may be used in combination as a matrix material for impregnation prior to addition of the thermoplastic(s) to form the composite materials to be used herein, including for example, without limitation, glass/carbon, glass/graphite/carbon, graphite/carbon, aramid/glass, ceramic/glass and PTFE or TFE copolymer fiber/carbon blends. In fiber blends or combined fibrous reinforcements, additional fibers may be provided in the form of chopped strands, filaments or whiskers to the fiber matrix. Further, such blends may include any range of potential woven or blended fibrous materials provided sufficient strength and other desired properties are retained.

The reinforcement fiber used in the first thermoplastic composite material herein is preferably a long fiber. Such fibers may be inorganic, ceramic, glass, graphite, carbon, and/or plastic (thermoplastic and thermoset) fibers (such as aramid fiber or Kevlar®). The continuous fibers may be unidirectional or bi-directional continuous fibers (preferably bidirectional fibers would have approximately 50% of the fibers in the parallel direction and approximately 50% of the fibers in the perpendicular direction), stretch-broken, braided fibers and woven continuous fibers. Additionally, the fibers may be braided or commingled fibers. Preferred diameters for the long fibers include about 0.1 microns, about 5 to about 15 microns, and about 7 to about 10 microns.

It is preferred that the long fiber reinforcement are about 30% or more, preferably 40% or more, more preferably 50% or more, most preferably about 60% to about 90% by volume of the first thermoplastic composite. It is preferred that the long fibers are about 40% to about 80% by volume of the first thermoplastic composite, and most preferred that they are about 50% to about 70% by volume of the thermoplastic composite.

The long fiber used in the first thermoplastic composite materials used herein can be provided by any long fiber-containing pre-preg or other impregnated composite structure. In one preferred embodiment herein, a continuous fiber structure may be used, such as an impregnated continuous fiber tape, fabric or the like. As used herein, continuous fibers in such structures are those which generally have a length being greater than about 0.5 inches (1.27 cm). Such tapes or other continuous fabric, tape, rod stock and the like may be cut or chopped to various lengths but preferably retain long fiber structures, for example, structures having reinforcing fibers primarily having a length to diameter ratio of greater than about 100. By varying the length of such cut feed structure, a variety of randomly dispersed long fibers can be found within the molded articles formed hereby, and the cut composite materials fed to the mold tend to separate easier for fitting within the first mold cavity.

Figure 1:
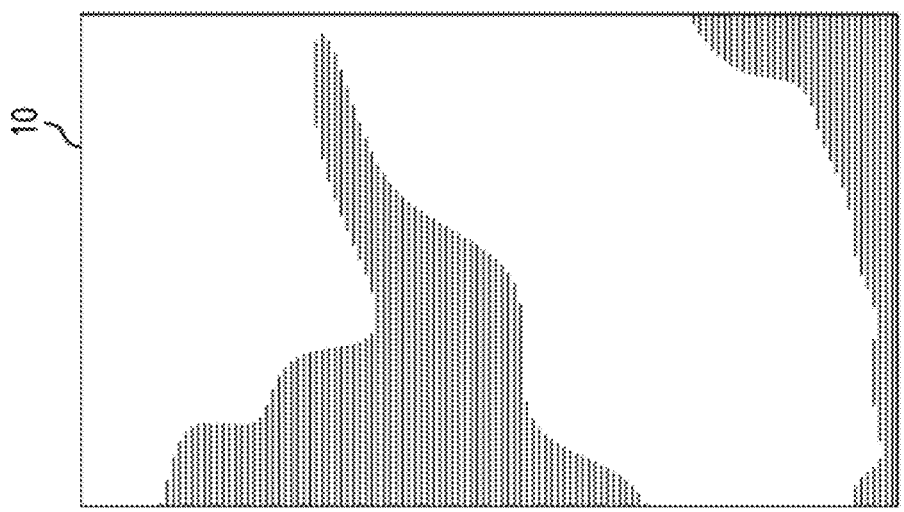

Such first thermoplastic composite materials, for example, chopped or cut continuous fiber reinforced thermoplastic fabric, tape, rod, etc., are fed into a mold according to the invention herein. As shown in schematic view in FIGS. 1 and 1a, a thermoplastic continuous fiber reinforced tape 10 may be used to form a first thermoplastic composite material 12. Upon cutting at various locations 14, various sections 16 are formed. Such sections 16 have varied lengths $l_1$, $l_2$, $l_3$, etc. as shown in FIG. 1a. The resulting sections 16 provide a first thermoplastic material feed stock for the method herein. The resulting structures have discontinuous long fiber reinforcement.

Figure 2:
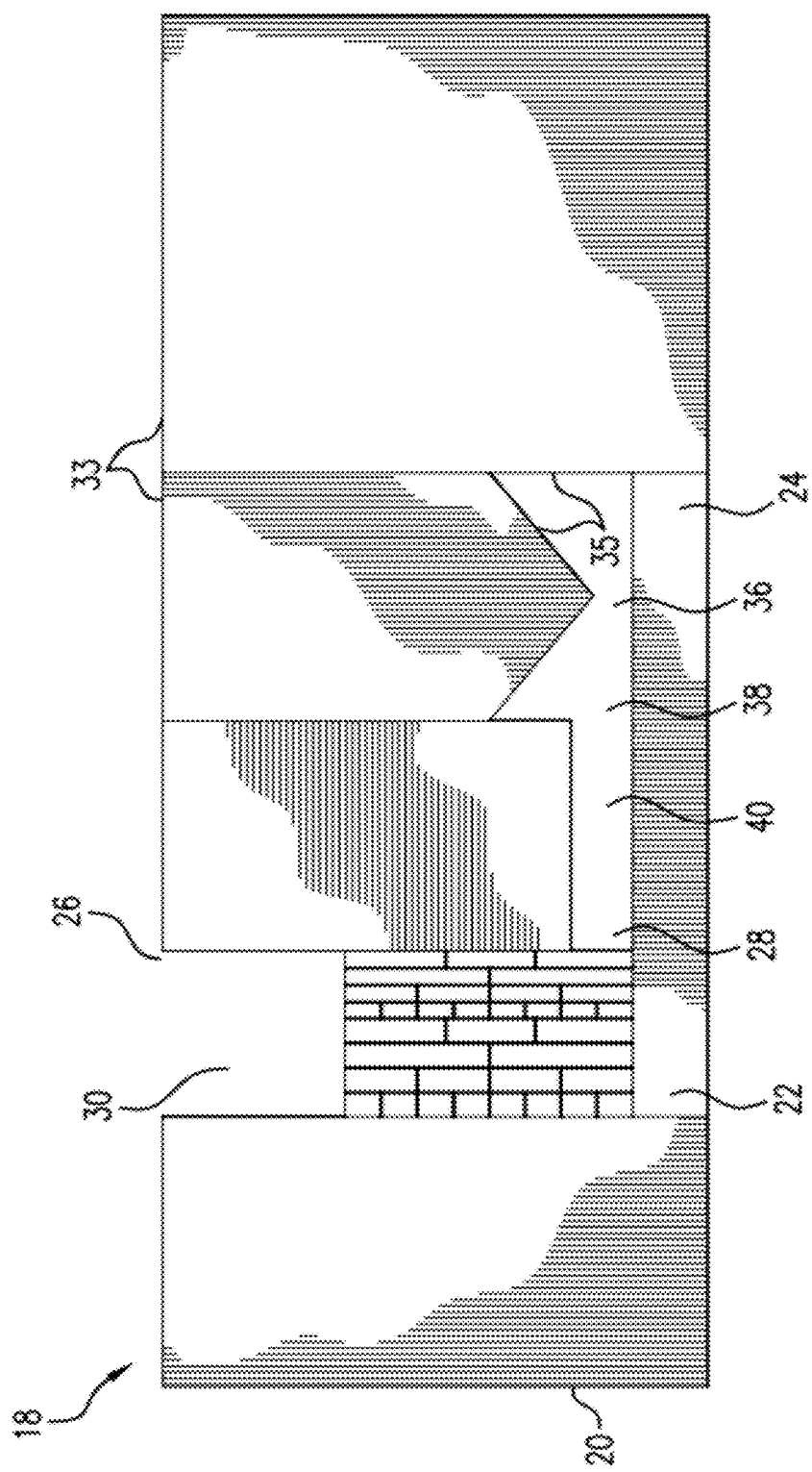
FIG. 2 is a schematic representation of a mold for use in an embodiment of the method described herein having a discontinuous long fiber reinforced thermoplastic composite material in the first mold cavity therein.

As shown schematically in FIG. 2, the mold 18 described herein has a mold body 20 and includes at least two co-nested cavities. It should be understood based on this disclosure, however, that the apparatus may include more than one such mold body, which mold bodies can be included in a press or other heating and/or cooling structure capable of applying pressure either located near each other laterally or in stacked configuration depending on the desired mold design to be used. With reference to FIG. 2, the mold 18 has at least one first mold section 22 and at least one second mold section 24. The first section 22 has an inlet 26 and an outlet 28. The first section is configured so as to define a first mold cavity 30 therein. The mold cavity 30 acts as a reservoir for heating and rendering flowable the feed stock in the form of long fiber reinforced thermoplastic composite, preferably having discontinuous fibers therein and more preferably of a variety of lengths. It should be understood that multiple mold sections 22 with inlets 26 for introducing material into cavities 30 can be incorporated within the scope of the invention so that either multiple composite feed sources can be provided to introduce thermoplastic composite to a single second mold cavity through multiple ports and/or so that multiple composite feed sources can be provided to introduce thermoplastic composite to multiple second mold cavities through one or more ports simultaneously.

Figure 3:
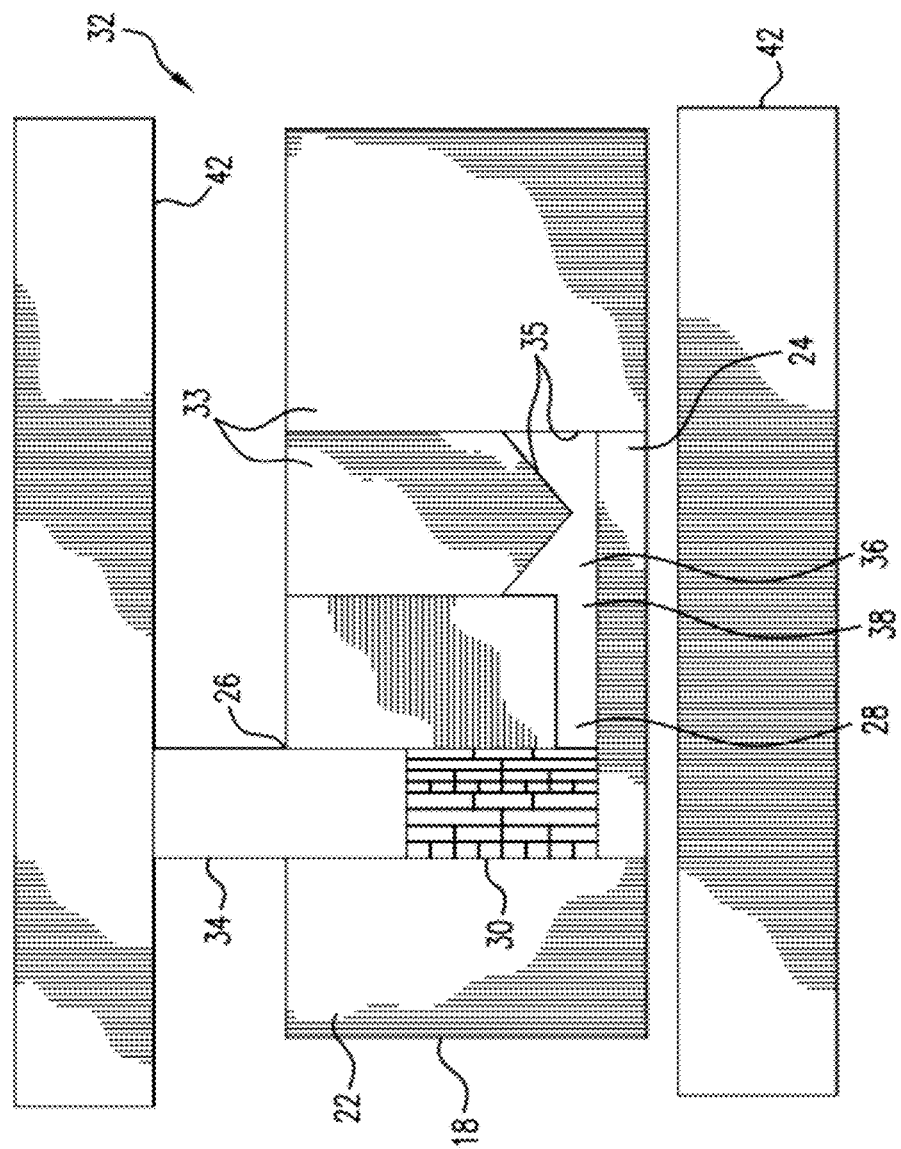
FIG. 3 is a schematic representation of a mold as in FIG. 2, placed in a heated press with a piston pressing down on the composite material in the first mold cavity.

With reference to FIG. 3, the apparatus 32 is shown according to an embodiment herein and includes the mold 18 and the mold cavity 30. The inlet 26 of the first section 22 is preferably configured to accommodate a piston, ram or other forcing structure such as piston 34. The piston or other structure should be configured so as to be able to enter the first mold cavity 30. As shown, a piston or other forcing structure can be made to fit snugly but slidably within the inlet 26 of the mold cavity to avoid back flow of thermoplastic once heated. As an alternative to a rod or piston, a pressing surface extending transversely across the inlet of the first mold section can be formed which is structurally strong enough to push, but is actuated by a pushing rod or hydraulic apparatus instead of a standard press force actuated piston or forcing structure. Preferably a rod or piston is used which under heated pressure from a heating and/or cooling drives the rod or piston into the first mold cavity. If multiple mold sections having multiple cavities 30 are used, either a single tool having multiple pressing structures aligned with such molds may be used or more than one such structure such as a rod or piston may be provided for use over each cavity's inlet 26.

The at least one second mold section 24 can include two or more fitting surfaces 35 which come together to define a second mold cavity 36 using one or more second mold section pieces 33. The fitting surfaces can include various features to define the shape of an ultimately molded article. For holes and other unique features, rods or other standard molding fittings can be used. The inlet 38 to the second mold section 24 allows for flowable thermoplastic composite material to enter the cavity 36 to form a shaped article. The outlet 28 of the first mold section 22 is in communication with the inlet 38 of the second mold section 24 so that thermoplastic composite from the reservoir first mold cavity 30 can flow into the second mold cavity 36 through a flow port 40. One or more flow ports can be formed for flowable thermoplastic composite material to move from one or more first mold cavity(ies) 30 to one or more second mold cavity(ies) 36, which may be useful for different distribution of polymer composite throughout the interior of mold cavity 36 or for use in feeding multiple second mold cavities.

After the first thermoplastic long fiber reinforced material is introduced to the first mold cavity, heat and pressure are applied to the composite material. As noted above, this may be done by a pressure structure such as piston 34 or a similar structure as noted above. A heated press can be used to apply downward force on the piston as well as provide heat to the at least one first mold section. Most preferably, the mold(s) 18 is/are configured so that it fits within heating and/or cooling platens of a press 42. The thermoplastic composite material in the first mold cavity is heated to a first process temperature. This processing temperature will vary depending on the thermoplastic composite feed material. For PEEK, for example, the temperature would be between about 750° F. to about 780° F., preferably about 760° F. To achieve the first processing temperature the first mold section should be heated under pressure to a temperature sufficient to sustain a flowable temperature for the composite within the first mold cavity. For a PEEK molding for example, the first mold would be heated to a temperature such that the PEEK achieved and remained in the first mold cavity at the processing temperatures noted above. Generally, the processing temperature, as noted above can vary with material, and examples of such temperatures will range accordingly. For example, the first process temperature may be about 175° F. to about 800° F., preferably about 175° F. to about 780° F., more preferably about 250° F. to about 780° F., and most preferably about 750° F. to about 780° F.

Preferably, the mold is maintained at about 200° F. to about 900° F., preferably about 400° F. to about 900° F., more preferably about 750° F. to about 900° F. and most preferably about 825° F. to about 875° F. until the processing temperature for the thermoplastic is achieved. Pressure may be applied while heating, and is preferably pressure of about 1,000 psi to about 10,000 psi, depending on the volume fiber loading and the material being used. Preferred pressures are about 2,000 psi to about 5,000 psi for most applications.

Figure 4:
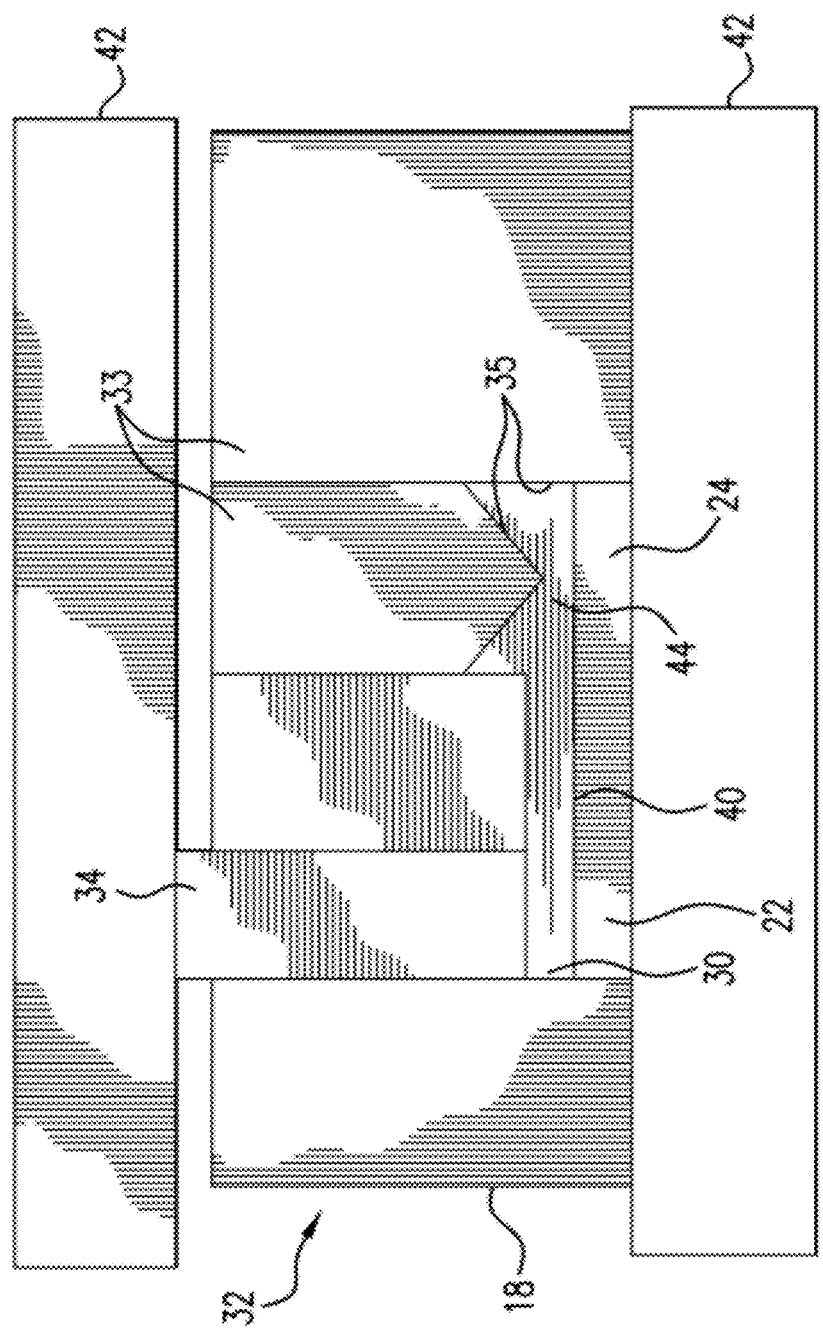
FIG. 4 is a schematic representation of the mold of FIG. 2 after the composite material entered the second mold cavity and is cooled to provide a formed article.

Once the processing temperature of the thermoplastic is achieved, pressure on the mold is released and the mold is subjected to a cooling press. The cooling press may be a separate press, using a mold transfer, or part of a single press having different zones for separate cycling of heating and cooling. The same pressure used for heating may be applied during the cooling cycle, and at this point, the heated processible thermoplastic which has been pressed down through the first mold cavity(ies) has passed into the second mold cavity(ies) (See FIG. 4) and the second mold section(s) is/are cooled. The cooling solidifies the first thermoplastic composite forms an article 44 is shaped within the second cavity(ies) and at least a portion of the article is shaped to conform to the configuration of the second cavity. Cooling should preferably occur until the mold(s) can be handled by an operator. The second mold section(s) is then opened separating various portions providing the shaping surfaces 35 to release the article 44 therein.

Figure 5:
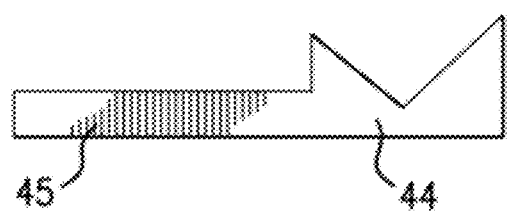
FIG. 5 is a schematic representation of the molded article in blank form taken from the second mold cavity.
Figure 6:
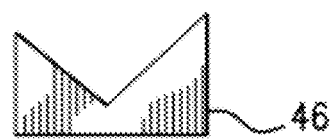
FIG. 6 is a schematic representation of the molded article after excess material from the blank in FIG. 5 is removed.

As shown in FIGS. 5 and 6 when the article(s) 44 formed in the one or more second mold cavity(ies) is/are removed from the mold, flashing or excess from the inlet area of the second mold cavity or the meeting points between shaping surfaces 35 may be on the article. Such excess portions 45 shown in FIG. 5 are removed to provide one or more finished part 46 as shown in FIG. 6.

Figure 7:
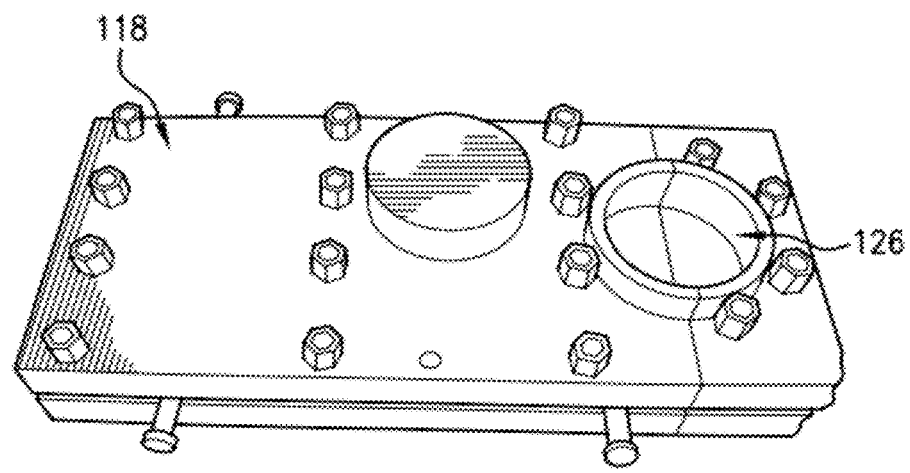
FIG. 7 is a photograph of an assembled mold according to an embodiment of the apparatus herein and for use in the method described herein.
Figure 8:
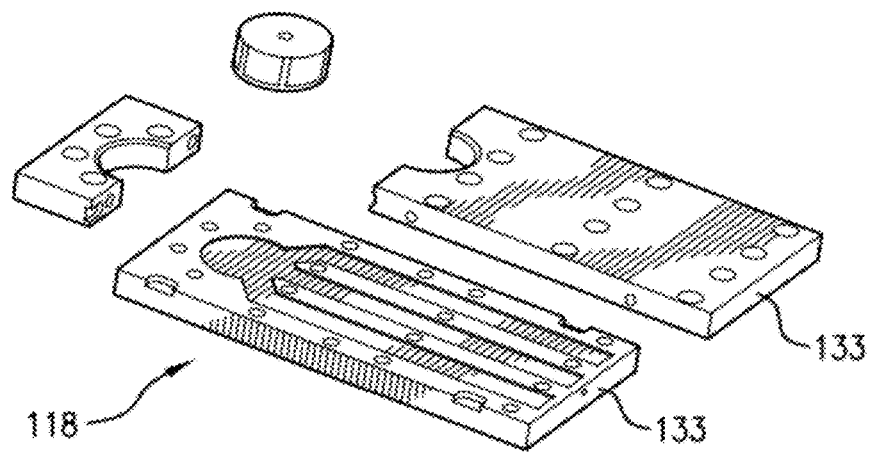
FIG. 8 is an exploded perspective view of the mold of FIG. 7.
Figure 9A:
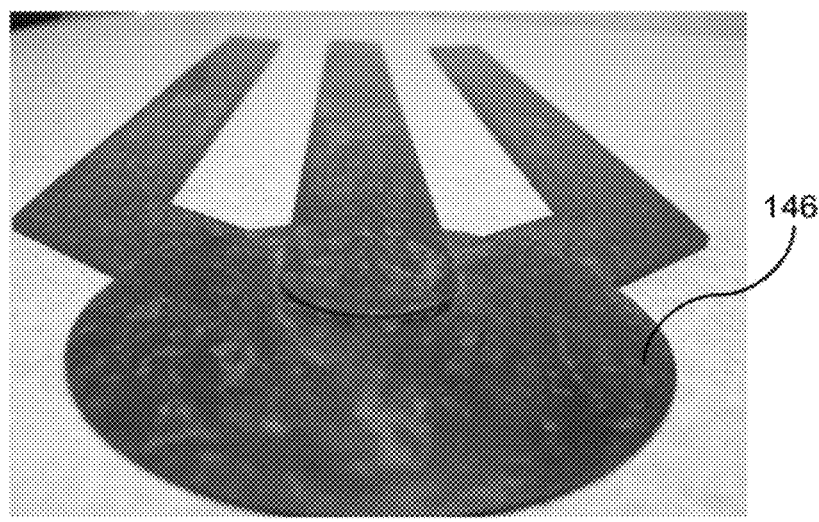
FIGS. 9a and 9b are photographs of molded parts formed from a mold as in FIG. 7.
Figure 9B:
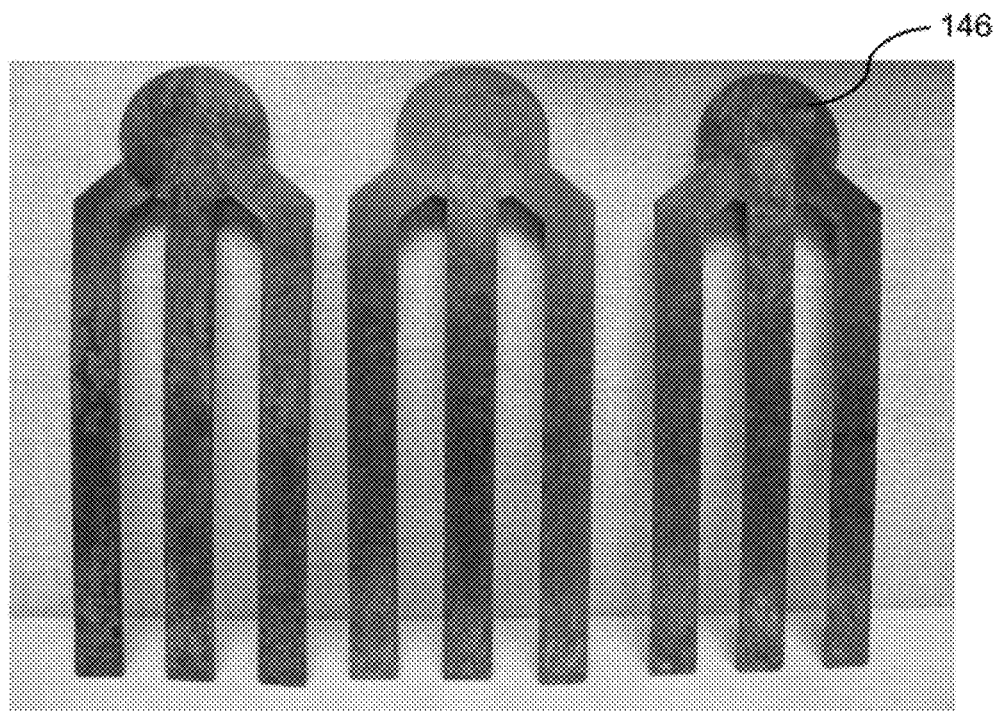

FIG. 7 shows an assembled mold 118 having an inlet opening 126 into a first mold cavity and pieces 133 defining a shaping area within the mold. Such assembled mold after being used in a process as described hereinabove provides a finished part 146 as shown in FIGS. 9*a* and 9*b* having a shape that conforms to the interior of the second cavity of the mold. FIG. 8 provides an exploded perspective view of the mold of FIG. 7 showing the interior portions of the mold body in the second molding cavity shaping portion for forming such parts.

Based on the foregoing, it can be seen that the molding method herein having co-nested molding cavities in separate molding sections allows for an easy and efficient method for forming high volume long fiber reinforced thermoplastic composite formed article.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of forming a thermoplastic article having a long fiber reinforcement, comprising a) providing a first thermoplastic composite material having at least about 40 volume percent of at least one long reinforcing fiber and chopping or cutting the first thermoplastic composite material to form a thermoplastic feed stock having discontinuous long fiber of varied lengths;

b) providing at least one mold, wherein each of the at least one mold comprises at least one first mold section having a wall defining an inlet and an outlet and defining a first mold cavity and at least one second mold section having a wall defining an inlet and defining a second mold cavity, wherein the outlet of the first mold section is in communication with the inlet of the second mold section via at least one flow port;

c) introducing the first thermoplastic composite material into the first mold cavity;

d) applying heat and pressure to the first thermoplastic composite material in the first mold cavity until the first mold section reaches at least a first process temperature;

e) releasing the pressure on the mold; and f) reapplying pressure to the mold while cooling, wherein at least a portion of the first thermoplastic composite material flows out of the outlet of the first mold section and into the second mold cavity so as to completely fill the second mold cavity with the first thermoplastic composite material, wherein said cooling solidifies the first thermoplastic composite to form a molded article having the shape of the second mold cavity and wherein the at least one long reinforcing fiber in the molded article is randomly dispersed.

2. The method according to claim 1, wherein the first thermoplastic composite material comprises a thermoplastic selected from the group consisting of polyolefins, poly (acrylonitrile-butadiene styrene), polystyrene, polybutadiene, polyacrylonitrile, poly(butadiene-styrene), poly(styrene-acrylonitrile), polybutylenes, cellulosic resins, ethylene vinyl acetates, ethylene vinyl alcohols, ionomers, liquid crystal polymers, polyacetals, polyacrylates, polyamides, polyphthalamides, polyphthalimides, polyimides, polyetheramides, polyamideimides, polyphenols, polycarbonates, polyesters, polyurethanes, polyvinyl chlorides, polyvinylidene chlorides, polyvinyls, polyesters, polyphenylene oxides, polyphenylene esters, polyphenylene ethers, polyphenylene ether esters, polyether esters, polyphenylene sulfides, polysulfones, polymethylpentenes, polyketones, polyarylene ethers, fluoropolymers, thermoplastic elastomers, epoxy resins, polybiscitraconicimides, polybismaleimides, bismaleimide/triazine/epoxy resins, polycyanate esters, cyanate resins, furanic resins, phenolic resins, urea-formaldehyde resins, melamine-formaldehyde resins, phthalocyanine resins, polybenzoxazole resins, acetylene-terminated polyimide resins, silicones, polytriazines, polyalkyds, xylene resins and copolymers, alloys, blends and derivatives thereof.

3. The method according to claim 2, wherein the thermoplastic comprises a polysulfone, a polyimide, a polyamideimide, a polyamide, or a polyarylene ether selected from the group consisting of polyether ketones, polyetherether ketones, polyetherketone ketones.

4. The method according to claim 2, wherein the thermoplastic comprises a fluoropolymer selected from the group consisting of copolymers of tetrafluoroethylene and at least one perfluoroalkylvinyl ether; copolymers of tetrafluoroethylene and at least one other perfluorinated alkylene, polychlorotrifluoroethylene, ethyl chlorotrifluoroethylene, ethyltrifluoroethylene, polyvinylidene fluoride, and polyvinyl fluoride.

5. The method according to claim 1, wherein the thermoplastic composite material comprises a thermoplastic is selected from polyetherether ketone, polyether ketone, polyether ketone ketone, copolymers of tetrafluoroethylene and at least one perfluoroalkylvinyl ether, and copolymers of tetrafluoroethylene and hexafluoropropylene.

6. The method according to claim 1, wherein the at least one reinforcing fiber is in the molded article is discontinuous long fiber.

7. The method according to claim 6, wherein the at least one reinforcing fiber comprises a fiber selected from the group consisting of inorganic fibers, ceramic fibers, glass fibers, graphite fibers, carbon fibers, thermoplastic fibers and/or thermosetting fibers.

8. The method according to claim 1, wherein step (a) further comprises chopping or cutting a continuous long fiber-reinforced composite into a plurality of sections having discontinuous long fiber.

9. The method according to claim 8, wherein the continuous long fiber-reinforced composite is a continuous long fiber-reinforced tape.

10. The method according to claim 8, wherein the plurality of sections having discontinuous long fiber have at least two different lengths measured in the longitudinal dimension of the section.

11. The method according to claim 1, wherein the first thermoplastic composite has at least about 50 volume percent of the at least one reinforcing fiber.

12. The method according to claim 11, wherein the first thermoplastic composite has at least about 60 volume percent of the at least one reinforcing fiber.

13. The method according to claim 1, wherein the method further comprises placing the mold into a heated press, and pressing downward upon the first thermoplastic composite material when it is in the first mold cavity using a ram or piston inserted into the inlet of the first mold section, wherein the heated press drives the ram or piston into the first mold cavity.

14. The method according to claim 1, wherein the first thermoplastic composite material is heated by heating the mold under pressure in step (d) to about 750° F. to about 900° F. until the first process temperature is achieved.

15. The method according to claim 14, wherein the mold is heated under pressure in step (d) to about 825° F. to about 875° F.

16. The method according to claim 14, wherein the first process temperature is about 750° F. to about 780° F.

17. The method according to claim 16, wherein the pressure is about 2,000 psi to about 5,000 psi.

18. The method according to claim 1, further comprising applying pressure to the first thermoplastic composite material in step (d) by placing the mold in a heated press at a pressure of about 1,000 psi to about 10,000 psi.

19. The method according to claim 1, wherein after releasing the pressure on the mold in step (e), the method further comprises placing the mold in a cooling press.

20. The method according to claim 19, wherein the cooling press applies pressure to the mold while cooling in step (f) of about 1,000 psi to about 10,000 psi.

21. The method according to claim 20, wherein the cooling press applies pressure to the mold while cooling in step (f) of about 2,000 psi to about 5,000 psi.

22. The method according to claim 1, wherein the mold has a plurality of flow ports.

23. The method according to claim 1, wherein step (f) comprises cooling the first thermoplastic material in the second mold cavity to a handling temperature.

24. The method according to claim 1, further comprising removing the molded article from the second mold cavity.

25. The method according to claim 1, wherein the second mold cavity comprises at least one molding fitting.

26. A method of forming a thermoplastic article having a long fiber reinforcement, comprising
a) providing a first thermoplastic composite material having at least about 40 volume percent of at least one long reinforcing fiber and chopping or cutting the first thermoplastic composite material to form a thermoplastic feed stock having discontinuous long fiber of varied lengths;
b) providing at least one mold, wherein each of the at least one mold comprises
at least one first mold section having a wall defining an inlet and an outlet and defining a first mold cavity and
at least one second mold section having a wall defining an inlet and defining a second mold cavity, wherein the outlet of the first mold section is in communication with the inlet of the second mold section via at least one flow port defined by the at least one mold wall so as to extend between the outlet of the first mold section and the inlet of the second mold section;
c) introducing the first thermoplastic composite material into the first mold cavity;
d) applying heat and pressure to the first thermoplastic composite material in the first mold cavity until the first mold section reaches at least a first process temperature;
e) releasing the pressure on the mold; and
f) reapplying pressure to the mold while cooling, wherein at least a portion of the first thermoplastic composite material flows out of the outlet of the first mold section and into the second mold cavity, wherein said cooling solidifies the first thermoplastic composite to form a molded article having the shape of the second mold cavity and wherein the at least one long reinforcing fiber in the molded article is randomly dispersed.

27. A method of forming a thermoplastic article having a long fiber reinforcement, comprising
providing a first thermoplastic composite material having at least about 40 volume percent of at least one long reinforcing fiber and chopping or cutting the first thermoplastic composite material to form a thermoplastic feed stock having discontinuous long fiber of varied lengths;
providing at least one mold, wherein each of the at least one mold comprises
at least one first mold section having a wall defining an inlet and an outlet and defining a first mold cavity and
at least one second mold section having a wall defining an inlet and defining a second mold cavity, wherein the outlet of the first mold section is in communication with the inlet of the second mold section via at least one flow port;
introducing the first thermoplastic composite material into the first mold cavity;
applying heat and pressure to the first thermoplastic composite material in the first mold cavity until the first mold section reaches at least a first process temperature;

applying pressure to the mold while cooling, wherein at least a portion of the first thermoplastic composite material flows out of the outlet of the first mold section and into the second mold cavity so as to completely fill the second mold cavity with the first thermoplastic composite material, wherein said cooling solidifies the first thermoplastic composite to form a molded article having the shape of the second mold cavity and wherein the at least one long reinforcing fiber in the molded article is randomly dispersed.

28. The method according to claim 27, wherein the molded first thermoplastic composite material in the article is a solid thermoplastic composite material shaped by the second mold cavity.

29. The method of claim 27, wherein the second mold cavity comprises at least one molding fitting.

30. A method of forming a thermoplastic article having fiber reinforcement, comprising:
   a) providing a first thermoplastic composite material having at least about 40 volume percent of at least one reinforcing fiber, wherein the first thermoplastic composite material is prepared by chopping or cutting a continuous long fiber-reinforced composite into a plurality of sections;
   b) providing at least one mold, wherein each of the at least one mold comprises
      at least one first mold section having a wall defining an inlet and an outlet and defining a first mold cavity and
      at least one second mold section having a wall defining an inlet and defining a second mold cavity, wherein the outlet of the first mold section is in communication with the inlet of the second mold section via at least one flow port;
   c) introducing the chopped or cut plurality of sections of the first thermoplastic composite material into the first mold cavity;
   d) applying heat and pressure to the first thermoplastic composite material in the first mold cavity until the first mold section reaches at least a first process temperature;
   e) releasing the pressure on the mold; and
   f) reapplying pressure to the mold while cooling, wherein at least a portion of the first thermoplastic composite material flows out of the outlet of the first mold section and into the second mold cavity so as to completely fill the second mold cavity with the first thermoplastic composite material, wherein said cooling solidifies the first thermoplastic composite to form a molded article having the shape of the second mold cavity and wherein the at least one reinforcing fiber in the molded article is randomly dispersed.

31. The method according to claim 30, wherein the continuous long fiber-reinforced composite is a continuous long fiber-reinforced tape.

32. The method according to claim 30, wherein the plurality of sections having discontinuous fiber have at least two different lengths measured in the longitudinal dimension of the section.

33. The method according to claim 30, wherein the first thermoplastic composite has at least about 50 volume percent of the at least one reinforcing fiber.

34. The method according to claim 33, wherein the first thermoplastic composite has at least about 60 volume percent of the at least one reinforcing fiber.

* * * * *